(12) United States Patent
Scherzer et al.

(10) Patent No.: US 7,001,977 B2
(45) Date of Patent: Feb. 21, 2006

(54) ADDUCTS OF POLYALKYLENE GLYCOL MONOGLYCIDYL ETHERS AND AMINE COMPOUNDS

(75) Inventors: Wolfgang Scherzer, Bergkamen (DE); Jörg Volle, Selm-Bork (DE); Doris Fitzek, Remscheid (DE)

(73) Assignee: Huntsman Advanced Materials Americas Inc., Brewster, NY (US)

(*) Notice: Subject to any disclaimer, the term of this patent is extended or adjusted under 35 U.S.C. 154(b) by 259 days.

(21) Appl. No.: 10/472,100

(22) PCT Filed: Mar. 6, 2002

(86) PCT No.: PCT/EP02/02414

§ 371 (c)(1),
(2), (4) Date: Sep. 15, 2003

(87) PCT Pub. No.: WO02/074832

PCT Pub. Date: Sep. 26, 2002

(65) Prior Publication Data

US 2004/0077802 A1 Apr. 22, 2004

(30) Foreign Application Priority Data

Mar. 15, 2001 (DE) .................. 101 12 555

(51) Int. Cl.
C08L 63/00 (2006.01)
C08G 65/26 (2006.01)

(52) U.S. Cl. .................. 528/111; 528/119; 528/121; 528/421; 528/422

(58) Field of Classification Search .................. None
See application file for complete search history.

(56) References Cited

U.S. PATENT DOCUMENTS

| 3,268,561 A | 8/1966 | Peppel et al. |
| 3,945,972 A | 3/1976 | Sakamoto |
| 4,088,633 A | 5/1978 | Gurney |
| 4,185,132 A | 1/1980 | Gurney |
| 5,245,048 A | 9/1993 | Rolfe et al. |

FOREIGN PATENT DOCUMENTS

| EP | 0491529 A1 | 6/1992 |
| JP | 61-064324 | * 4/1986 |
| JP | 02202883 | 8/1990 |

OTHER PUBLICATIONS

Abstract of JP 61-064324, provided by the JPO website.*
"Synthesis of Glycidyl-Type Epoxy Resins," Lee & Neville, *Handbook of Epoxy Resins*, Chapter 2, pp. 2-1 to 2-33 (1967, McGraw-Hill, Inc.) (1982 Reissue).

* cited by examiner

Primary Examiner—Michael J. Feely
(74) Attorney, Agent, or Firm—Proskauer Rose LLP

(57) ABSTRACT

The present invention relates to adducts obtainable by reaction of: A) an amine compound containing 2 or more than 2 amino groups: with B) a polyalkylene glycol monoglycidyl ether of general formula (I), in which R independently of one another (for n>1), is an —H or —CH, radical, and n=1 to 50, characterized in that the reaction ratio of components A) and B) is selected in such a way that the resultant adduct contains 2 or more than 2 amine hydrogen groups: to curable compositions based on these adducts with epoxy resins, and to the use of these curable compositions as casting resin, adhesive, matrix resin, tooling resin or as coating composition, in particular for self-flowing coatings.

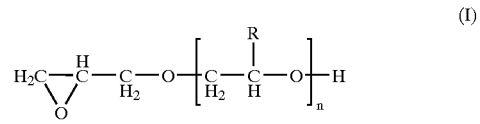

(I)

18 Claims, No Drawings

ADDUCTS OF POLYALKYLENE GLYCOL MONOGLYCIDYL ETHERS AND AMINE COMPOUNDS

The present invention relates to adducts obtainable by the reaction of aliphatic, cycloaliphatic or aromatic polyamines with polyalkylene glycol monoglycidyl ethers, to curable compositions based on these adducts with epoxy resins, and to the use of these curable compositions.

Curable mixtures based on aminic curing agents and epoxy resins are widely employed in industry for the coating and hardening of metallic and mineral substrates, as adhesive and sealant, as matrix resin, as tooling resin or very generally as casting resin for the production of mouldings or sheet-like structures. The aminic curing agents employed are, in particular, aliphatic, cycloaliphatic or aromatic amines, and polyamines and polyaminoamides optionally containing imidazoline groups.

The mechanical and physical properties of the curable mixtures based on these amines are adequate for many applications.

However, in cases where it is necessary to use amine compounds of which low volatility is expected, adducts of these amines with epoxy resins are used. The advantages are lower odour nuisance and toxicology.

In addition, lower MAC values enable evaporation of the amine to be reduced. The disadvantage is generally high viscosity of adducts of this type.

Surprisingly, it has now been found that adducts of amines with polyalkylene glycol monoglycidyl ethers have comparatively low viscosities. Furthermore, it has been found, surprisingly, that adducts with polyalkylene glycol monoglycidyl ethers cure significantly more quickly with epoxy resins than other adducts with monofunctional epoxides.

The invention therefore relates to adducts obtainable by reaction of
A), an amine compound containing 2 or more than 2 amino groups, with
B), a polyalkylene glycol monoglycidyl ether of the general formula (I)

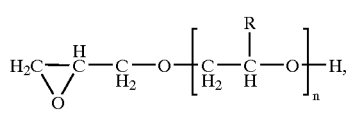

(I)

in which R, independently of one another (for n>1), is an —H or —CH$_3$ radical, and n=1 to 50, preferably n=3 to 35, characterized in that the reaction ratio of components A) and B) is selected in such a way that the resultant adduct has 2 or more than 2 amine hydrogen groups.

The polyalkylene glycol monoglycidyl ethers B) are prepared by a process which is generally known—addition of epichlorohydrin onto the polyalkylene glycol at 30° C.–60° C. in the presence of tetrafluoroboric acid, ring closure in the presence of aqueous sodium hydroxide solution, and subsequent separation of the aqueous sodium chloride solution. The molar ratio between polyalkylene glycol and epichlorohydrin is preferably 1:1. An excess of epichlorohydrin results in increased formation of diglycidyl ethers, while a sub-stoichiometric amount of epichlorohydrin results in larger amounts of reactive, unreacted polyalkylene glycols remaining in the product. It is possible to employ ethylene glycols and propylene glycols, starting from the monomers, i.e. ethylene glycol and propylene glycol, up to polymers thereof having a mean molecular weight of about 3000. Preference is given to polyalkylene glycols having a mean molecular weight of from 200 to 2000.

The amine compound A) used can be any amine which has at least 2 amino groups per molecule, such as, for example, polyethylenepolyamines, such as diethylenetriamine, triethylenetetramine, tetraethylenepentamine, etc.; polypropylenepolyamines, such as dipropylenetriamine, tripropylenetetramine and the polyamines obtained by cyanoethylation of polyamines, in particular of ethylenediamine, and subsequent complete or partial hydrogenation; aliphatic amines, such as diaminoethane, diaminopropane, neopentanediamine, diaminobutane, hexamethylenediamine, 2,2,4(2,4,4)-trimethylhexamethylene-1,6-diamine; cycloaliphatic polyamines, such as isophoronediamine, diaminocyclohexane, norbornanediamine, 3(4),8(9)-bis(aminomethyl)tricyclo [5,2,I,O] decane, (TCD-diamine), 1,3-bis(aminomethyl)cyclohexane, bis(aminomethylcyclohexyl)methane; heterocyclic polyamines, such as N-aminoethylpiperazine, 1,4-bis(aminopropyl)piperazine; aromatic amines, such as, for example, diaminodiphenylmethane; polyaminoamides optionally containing imidazoline groups, such as, for example, products of the condensation of monomeric or dimeric fatty acids with polyethylenepolyamines. It is also possible to use mixtures of amines.

The amine component is preferably isophoronediamine, xylylenediamine, bis(aminomethylcyclohexyl)methane and 2,2,4(2,4,4)-trimethylhexamethylene-1,6-diamine, triethylenetetramine, N-aminoethylpiperazine, 1,2-diaminocyclohexane and norbornanediamine. The adducts according to the invention are prepared by a process known per se by adding the polyalkylene glycol monoglycidyl ether of the general formula (I) dropwise to the initially introduced amine compound at 50° C.–200° C., preferably at 60° C.–80° C., and stirring the mixture at the same temperature for about 1 hour until the reaction is complete.

The degree of adduction depends on the proposed application and on the desired viscosity of the amine adduct. However, at least two amine hydrogens must be present per molecule after the reaction with the polyalkylene glycol monoglycidyl ether. It is also possible to use isolated adducts prepared using an excess of the amine component. In this case, from 1.5 to 10 times, preferably from 4 to 6 times, the molar amount of amine is initially introduced, and the polyalkylene glycol monoglycidyl ether is advantageously added dropwise at 60° C.–80° C. with stirring. The excess amine is subsequently removed by distillation under reduced pressure.

The adducts prepared in this way are suitable for the curing of epoxide compounds. The invention therefore furthermore also relates to a curable composition comprising
a), an epoxy resin containing on average more than one epoxide group per molecule,
b), an adduct of A), an amine compound containing 2 or more than 2 amino groups, and B), a polyalkylene glycol monoglycidyl ether of the general formula (I)

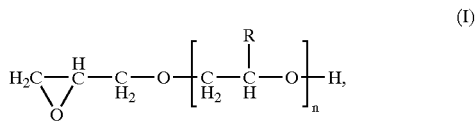

(I)

in which R, independently of one another (for n>1), is an —H or —CH$_3$ radical, and n=1 to 50, preferably n=3 to 35, characterized in that the reaction ratio of components A) and B) is selected in such a way that the resultant adduct contains 2 or more than 2 amine hydrogen groups.

The adduct b) used as curing agent is employed in the conventional advantageous amounts, according to which from 0.5 to 2.0, preferably from 0.75 to 1.25, functional groups (amine hydrogens) of adduct b) are present in the respective composition per epoxide group of component a).

The invention furthermore relates to cured products obtainable by curing a composition of this type.

In general, the curing of the epoxy resins with the curing agents according to the invention is carried out in the presence of further additives c1), such as diluents, and/or c2) other auxiliaries and additives which are conventional in epoxy resin technology.

Diluents c1) which can be used are both compounds which substantially remain in the thermoset material after curing, such as, for example, high-boiling alcohols and ethers, such as benzyl alcohol, propylene glycol, diethylene glycol monobutyl ether, etc., and also compounds which substantially evaporate out of the coating during curing, such as, for example, xylene, butanol, methoxypropanol, as well as water. Preference is given here to benzyl alcohol and water. The auxiliaries and additives c2) can furthermore be the conventional fillers, such as gravels, sands, silicates, graphite, silicon dioxide, talc, mica, etc., in the particle size distributions which are conventional in this area, furthermore pigments, dyes, stabilizers, flow-control agents, plastication agents, unreactive extender resins and plasticizers.

The epoxide compounds a) used concomitantly in accordance with the invention are commercially available products containing on average more than one epoxide group per molecule which are derived from monohydric and/or polyhydric and/or polycyclic phenols, in particular bisphenols, as well as novolaks, such as, for example, bisphenol A diglycidyl ether and bisphenol F diglycidyl ether. An extensive list of these epoxide compounds is given in the handbook "Epoxidverbindungen und Epoxidharze" [Epoxide Compounds and Epoxy Resins] by A. M. Paquin, Springer Verlag Berlin, 1958, Chapter IV, and in Lee & Neville, "Handbook of Epoxy Resins", 1967, Chapter 2. It is also possible to use mixtures of two or more different epoxide compounds a). In accordance with the invention, preference is given to mixtures of glycidyl ethers based on bisphenol A, bisphenol F or novolaks with so-called reactive diluents, such as, for example, monoglycidyl ethers of phenols or glycidyl ethers based on monohydric or polyhydric aliphatic or cycloaliphatic alcohols. Examples of reactive diluents of this type are, for example, phenyl glycidyl ether, cresyl glycidyl ether, p-tertiary-butyl phenyl glycidyl ether, butyl glycidyl ether, C$_{12}$–C$_{14}$alcohol glycidyl ethers, diethylene glycol monobutyl ether, diethylene glycol monohexyl ether, cyclohexanedimethyl diglycidyl ether or glycidyl ethers based on polyethylene glycols or polypropylene glycols. If necessary, the viscosity of the epoxy resins can be reduced further by addition of these reactive diluents.

The compositions according to the invention can very generally be employed as casting resins for the production of cured products and can be used in the formulation matched to the respective area of application, for example as adhesives, as matrix resins, as tooling resins or as coating compositions. Owing to their low viscosity, the adducts according to the invention are particularly suitable for self-flowing coatings.

The adducts according to the invention are particularly suitable for applications in which only cold-curing or curing at low temperatures (outdoor application) is possible, for example for industrial floorcoverings.

Analytical Methods

Viscosity

Measured using the Haake RV 20 rotational viscometer in accordance with the manufacturer's instructions.

Amine Number

Measured in accordance with DIN 16945.

Tecam Value

Value for the gelling time, measured using a Tecam GT3 gelation timer from Techne, Cambridge, GB, at 23° C. and 50% relative atmospheric humidity.

Sample mixture of resin and curing agent=250 g.

Colour Number

Measured in accordance with DIN 53995 using a Lovibond calorimeter (Gardner colour number).

EXAMPLES

A) Preparation of the Polyalkylene Glycol Monoglycidyl Ethers

The polyalkylene glycol monoglycidyl ethers are prepared from 1 mol of polyalkylene glycol and 1 mol of epichlorohydrin by a generally known process—addition of epichlorohydrin onto the polyalkylene glycol at 30° C.–60° C. in the presence of tetrafluoroboric acid, ring closure in the presence of aqueous sodium hydroxide solution, and subsequent separation of the aqueous sodium chloride solution. The properties of the polyalkylene glycol monoglycidyl ethers prepared in this way are shown in Table 1.

TABLE 1

| Example | Polyalkylene glycol | Epoxide value (mol/100 g) | EP equivalent (g/epoxide group) |
| --- | --- | --- | --- |
| 1 | PPG[1] 620 | 0.137 | 730 |
| 2 | PPG 400 | 0.183 | 546 |
| 3 | PPG 1900 | 0.044 | 2273 |
| 4 | PEG[2] 400 | 0.190 | 526 |

[1]polypropylene glycol;
[2]polyethylene glycol

Examples 5–18

The adducts according to the invention are prepared by the following procedure: The polyalkylene glycol monoglycidyl ether in accordance with one of Examples 1 to 4 is added dropwise under nitrogen atmosphere over the course of half an hour to the amine compound warmed to 60° C. The reaction mixture is subsequently stirred at 100° C. for a further 60 minutes. The adduct prepared in this way can be employed without further work-up. The mixing ratios of the components employed and the properties of adducts 5 to 18 prepared in this way are shown in Tables 2 and 3.

TABLE 2

| Example | P[1] from Example | PAGMGE [g] (equivalent) | Amine compound | Amine [g] (active H) | Amine[*] equivalent |
|---|---|---|---|---|---|
| 5 | 1 | 365 (0.5) | Isophoronediamine | 170 (4) | 153 |
| 6 | 2 | 273 (0.5) | Isophoronediamine | 170 (4) | 127 |
| 7 | 3 | 1136 (0.5) | Isophoronediamine | 170 (4) | 373 |
| 8 | 4 | 263 (0.5) | Isophoronediamine | 170 (4) | 124 |
| 9 | 1 | 365 (0.5) | Xylylenediamine | 136 (4) | 143 |
| 10 | 2 | 173 (0.5) | Bis(aminomethyl)-cyclohexane | 142 (4) | 119 |
| 11 | 3 | 1136 (0.5) | (2,2,4)2,4,4-Trimethyl-hexamethylenediamine | 158 (4) | 370 |
| 12 | 4 | 263 (0.5) | Triethylenetetramine | 146 (4) | 74 |
| 13 | 1 | 365 (0.5) | N-Aminoethylpiperazine | 129 (3) | 198 |
| 14 | 2 | 546 (1) | Xylylenediamine | 136 (4) | 227 |
| 15 | 3 | 2272 (1) | Isophoronediamine | 170 (4) | 814 |
| 16 | 4 | 526 (1) | 1,2-Diaminocyclohexane | 114 (4) | 213 |
| 17 | 1 | 182 (0.25) | Norbornanediamine | 156 (4) | 90 |
| 18 | 2 | 819 (1.5) | Xylylenediamine | 136 (4) | 382 |

[1]P = polyalkylene glycol monoglycidyl ether (PAGMGE), compound according to Table 1
[*]of the amine adduct prepared

TABLE 3

| Example | C[2] | V[3] |
|---|---|---|
| 5 | 1 | 640 |
| 6 | 1–2 | 850 |
| 7 | 1–2 | 390 |
| 8 | 1–2 | 905 |
| 9 | 2 | 490 |
| 10 | 1–2 | 510 |
| 11 | 1–2 | 320 |
| 12 | 2–3 | 980 |
| 13 | 2–3 | 1050 |
| 14 | 2–3 | 1200 |
| 15 | 1–2 | 870 |
| 16 | 3 | 900 |
| 17 | 1–2 | 315 |
| 18 | 3 | 2130 |

[2]colour number;
[3]viscosity in mPa · s

Application Examples 100 g of a bisphenol F diglycidyl ether having an epoxide equivalent of 167 are mixed with an adduct curing agent in accordance with one of Examples 5–18 and cured at room temperature. The curing rate (determined in accordance with Shore D) and the gelling time (Tecam) are shown in Table 4.

TABLE 4

| Example | Curing agent [g] | Shore D at 23° C. after days | | | 7 + 2 h/ 120° C. | Gelling time [min] |
| | | 1 | 2 | 3 | | |
|---|---|---|---|---|---|---|
| 5 | 92 | 40 | 52 | 68 | 79 | 70 |
| 6 | 76 | 45 | 65 | 69 | 80 | 64 |
| 7 | 223 | 20 | 41 | 58 | 74 | 136 |
| 8 | 74 | 41 | 61 | 67 | 79 | 60 |
| 9 | 86 | 39 | 60 | 65 | 78 | 79 |
| 10 | 71 | 37 | 56 | 65 | 81 | 54 |
| 11 | 221 | 19 | 40 | 60 | 75 | 150 |
| 12 | 44 | 47 | 65 | 71 | 82 | 57 |
| 13 | 119 | 35 | 64 | 69 | 78 | 75 |
| 14 | 136 | 36 | 56 | 66 | 76 | 82 |
| 15 | 487 | 10 | 30 | 51 | 70 | 175 |
| 16 | 128 | 42 | 60 | 68 | 78 | 100 |
| 17 | 54 | 46 | 59 | 68 | 81 | 62 |
| 18 | 229 | 17 | 34 | 58 | 77 | 134 |

What is claimed is:

1. An adduct obtainable by reaction of:
   A) an amine compound containing two or more than two amino groups, with
   B) a polyalkylene glycol monoglycidyl ether of the general formula (I)

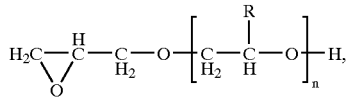

in which R, independently of one another (for n>1), is an —H or —CH₃ radical, and n is 1 to 50;
wherein the reaction ratio of components A) and B) is selected in such a way that the resultant adduct contains two or more than two amine hydrogen groups.

2. An adduct according to claim 1, wherein n is 3 to 35 for the polyalkylene monoglycidyl ether of the general formula (I).

3. An adduct according to claim 1, wherein the polyalkylene glycol monoglycidyl ether is prepared by the addition of epichlorohydrin onto polyalkylene glycol, and wherein said polyalkylene glycol has a mean molecular weight of from 200 to 2000.

4. The adduct of claim 3, wherein said polyalkylene glycol is polypropylene glycol or polyethylene glycol.

5. An adduct according to claim 1, wherein component A) is a cycloaliphatic, heterocyclic, aromatic polyamine, or imidazoline-containing polyaminoamide.

6. An adduct according to claim 1, wherein the component A) is selected from the group consisting of isophoronediamine, xylylenediamine, bis(aminomethylcyclohexyl)methane and 2,2,4(2,4,4)-trimethylhexamethylene-1,6-diamine, triethylenetetramine, N-aminoethylpiperazine, 1,2-diaminocyclohexane and norbornanediamine.

7. An adduct according to claim 1, wherein an excess of the amine compound is reacted with the polyalkylene glycol monoglycidyl ether.

8. The adduct of claim 7, wherein from 1.5 to 10 times the molar amount of amine is introduced, and the polyalkylene glycol monoglycidyl ether is added thereto.

9. The adduct of claim 8, wherein from 4 to 6 times the molar amount of amine is introduced.

10. A curable composition comprising
 a) an epoxide compound containing on average more than one epoxide group per molecule; and
 b) an adduct according to claim 1.

11. A curable composition according to claim 10, wherein n is 3 to 35 for the polyalkylene monoglycidyl ether of the formula (I).

12. A curable composition according to claim 10, wherein the adduct b) is present in an amount such that from 0.5 to 1.25 functional groups of b) are present in the composition per epoxide group of component a).

13. A curable composition according to claim 12, wherein the adduct b) is present in an amount such that from 0.75 to 1.25 functional groups of adduct b) are present in the composition per epoxide group of component a).

14. A curable composition according to claim 10, wherein component a) is derived from a polyhydric or polycyclic phenol.

15. A curable composition according to claim 14, where the phenol is bisphenol A, bisphenol F or a novolak.

16. The curable composition of claim 15 further comprising a reactive diluent.

17. A curable composition according to claim 10, further comprising a diluent.

18. A product obtained by curing a composition according to claim 10.

* * * * *